Nov. 1, 1955
W. T. EATON ET AL
2,722,262
APPARATUS FOR THE CONTINUOUS PRODUCTION
OF PAPER-ENCASED GYPSUM PLASTER STRIP
Filed June 7, 1954
10 Sheets-Sheet 1
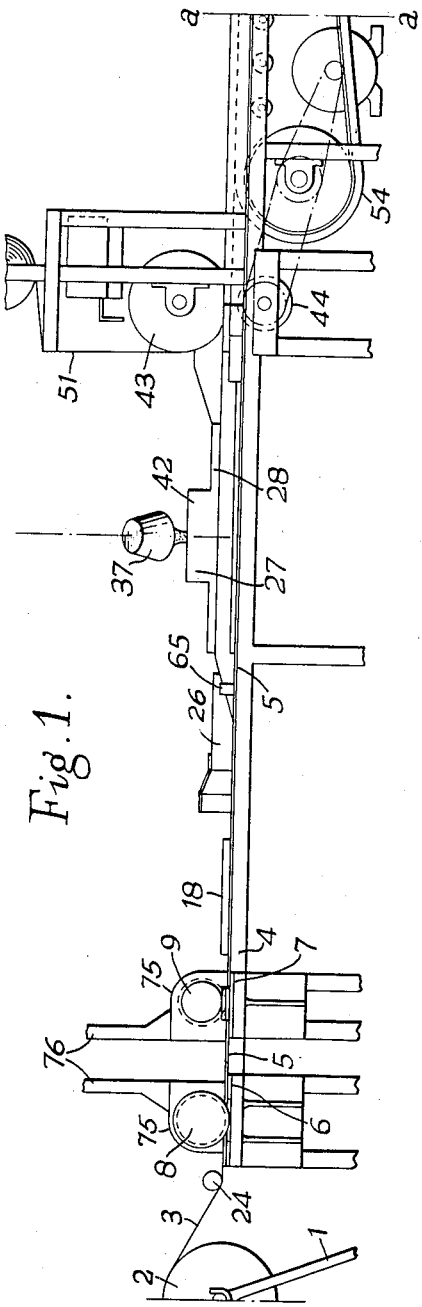
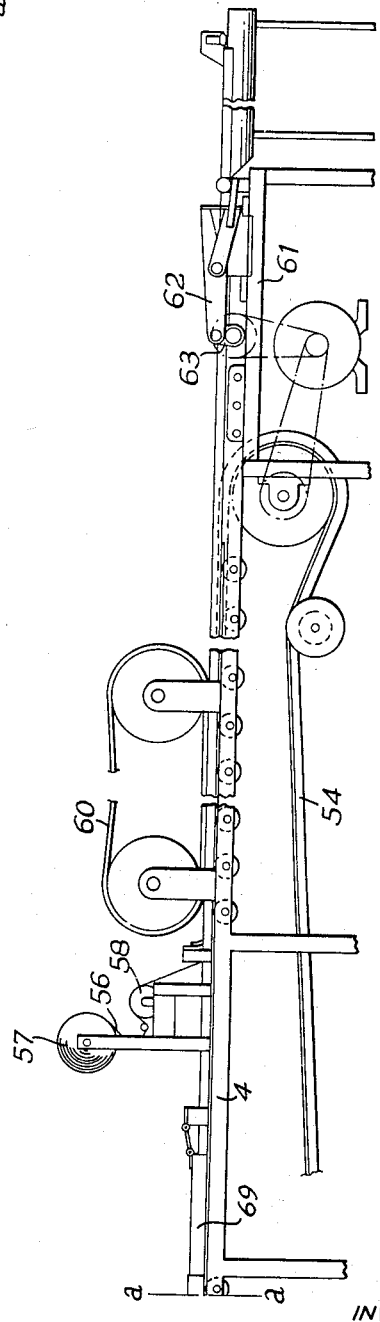
Fig.1.
INVENTORS
William T. Eaton
Frederick E. Strable
BY
Ralph B. Stewart
ATTORNEY Nov. 1, 1955 W. T. EATON ET AL 2,722,262
APPARATUS FOR THE CONTINUOUS PRODUCTION
OF PAPER-ENCASED GYPSUM PLASTER STRIP
Filed June 7, 1954 10 Sheets-Sheet 4
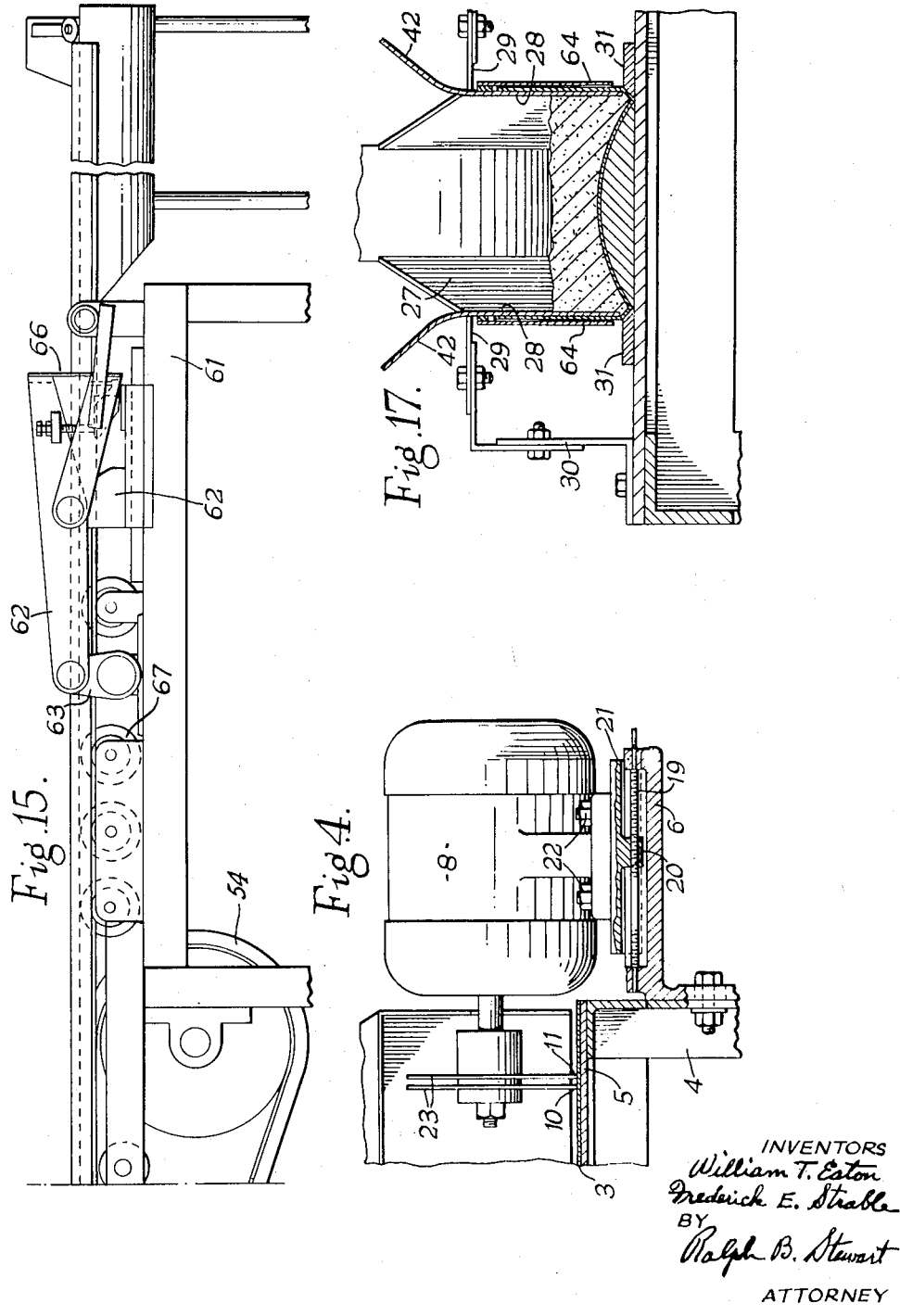
INVENTORS
William T. Eaton
Frederick E. Strable
BY
Ralph B. Stewart
ATTORNEY

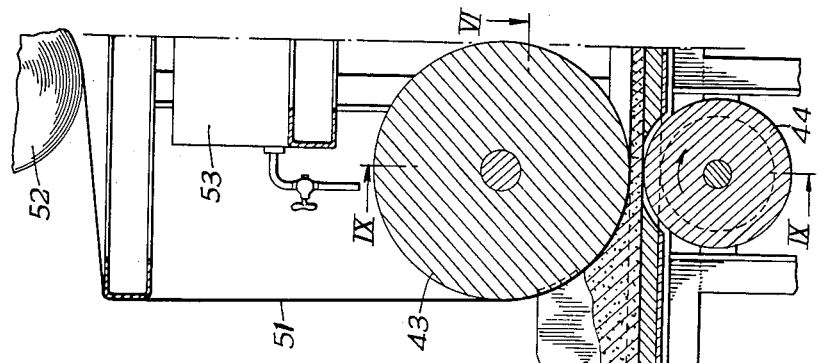
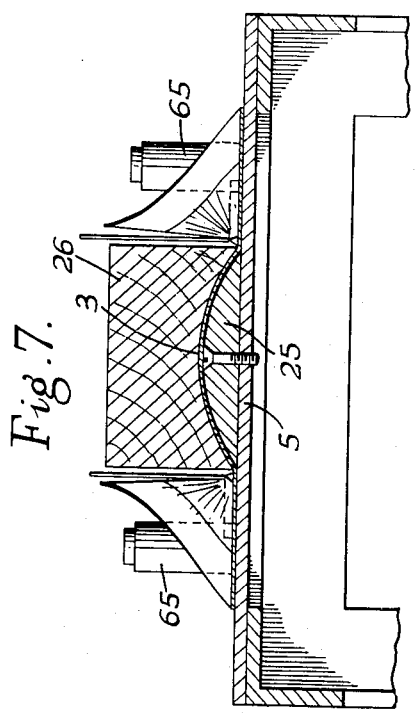
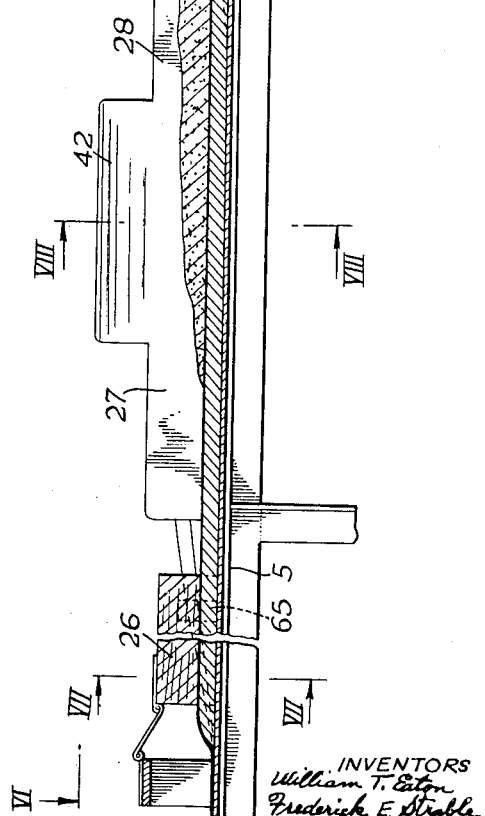

INVENTORS
William T. Eaton
Frederick E. Strable
BY
Ralph B. Stewart
ATTORNEY

Nov. 1, 1955 W. T. EATON ET AL 2,722,262
APPARATUS FOR THE CONTINUOUS PRODUCTION
OF PAPER-ENCASED GYPSUM PLASTER STRIP
Filed June 7, 1954 10 Sheets-Sheet 9
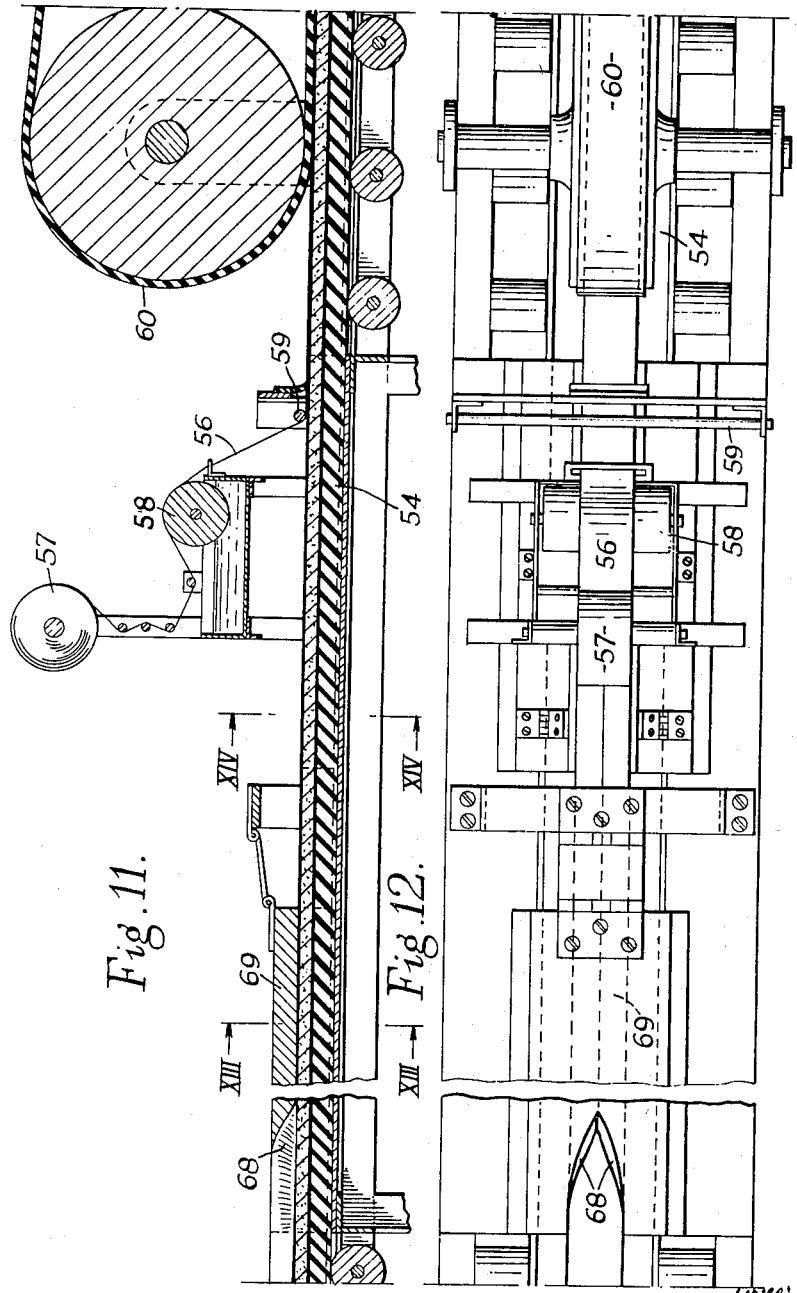
INVENTORS
William T. Eaton
Frederick E. Strable
BY
Ralph B. Stewart
ATTORNEY Nov. 1, 1955 W. T. EATON ET AL 2,722,262
APPARATUS FOR THE CONTINUOUS PRODUCTION
OF PAPER-ENCASED GYPSUM PLASTER STRIP
Filed June 7, 1954 10 Sheets-Sheet 10

INVENTORS
William T. Eaton
Frederick E. Strable
BY
Ralph B. Stewart
ATTORNEY

United States Patent Office 2,722,262
Patented Nov. 1, 1955

2,722,262

APPARATUS FOR THE CONTINUOUS PRODUCTION OF PAPER-ENCASED GYPSUM PLASTER STRIP

William Toulmin Eaton, Chatham, and Fredrick Ernest Strable, Strood, England, assignors to Gyproc Products Limited, Gravesend, England Application June 7, 1954, Serial No. 434,913

Claims priority, application Great Britain June 19, 1953

7 Claims. (Cl. 154—1.2)

The present invention relates to an apparatus for the continuous production of a paper-encased gypsum plaster strip of constant profile in cross-section such for example as a strip suitable for use as a cornice strip as fitted in the angle at the junction of a wall and ceiling of a building.

As an example the apparatus according to the invention is well adapted for use in the production of the so-called "cove" cornice comprising a gypsum plaster core of arcuate curved profile in section on one side and having on the other side a flat central longitudinal zone bounded by two flat outer longitudinal zones lying in planes at right angles to one another and two narrow flat longitudinal edge surfaces usually also at right angles to one another and at 45° to the surface of the central longitudinal zone, the whole being encased, or lined on all surfaces with lining paper serving to impart great mechanical strength to the otherwise brittle plaster core as well as to provide a surface well adapted for subsequent finishing, decorating and like treatments.

The apparatus according to the invention for producing paper-encased gypsum plaster strip, comprises means for folding progressively, a longitudinally moving flat strip of paper, into the form of an elongated trough, guide means adapted for engagement within the formed paper trough and constituting boundary side walls for the retention of plaster slurry introduced into the paper trough, a pair of superposed co-operating rollers located at a point beyond the guide means, the lower of said rollers having a peripheral shape in cross section corresponding to the cross-sectional form of one face of the paper-encased gypsum plaster strip to be formed and being disposed for engagement with the underside of the plaster-containing part of the travelling paper trough, and the upper of said rollers being disposed so that its lower part may lie within the plaster-containing part of the travelling paper trough but spaced from the bottom thereof, means for maintaining the side walls of the travelling paper trough in engagement with the end surfaces of the upper roller, and folding means located beyond the pair of rollers adapted to fold down the free edges of the paper trough on to the upper surface of the plaster in the paper trough.

The apparatus may include a scoring device for scoring a paper strip drawn from a supply reel on appropriate spaced parallel lines as it approaches the folding means, such as to ensure that the paper is folded to provide the required cross section of finished strip.

The invention is illustrated by way of example in the accompanying drawings as applied to a machine capable of producing so-called "cove" cornice as described above.

In the drawings,

Fig. 1 is a diagrammatic side elevational view of the complete machine, the figure being divided into two parts on the line a—a.

Fig. 4 is a part sectional end view on still a larger scale and taken on the line IV—IV of Fig. 3.

Fig. 5 is a view in sectional side elevation showing means for shaping the scored paper strip and applying core-forming plaster thereto.

Figs. 7, 8 and 9 are sectional end elevational views taken on the lines VII—VII, VIII—VIII and IX—IX of Fig. 5.

Figs. 11 and 12 are views in elevation and plan respectively of a part of the machine for completing the folding of the paper strip on the plaster core.

Fig. 15 is a view in side elevation of the outlet end of the machine and means for cutting the formed paper-encased strip.

Fig. 17 illustrates a modified form of a part of the machine.

Figure 2:
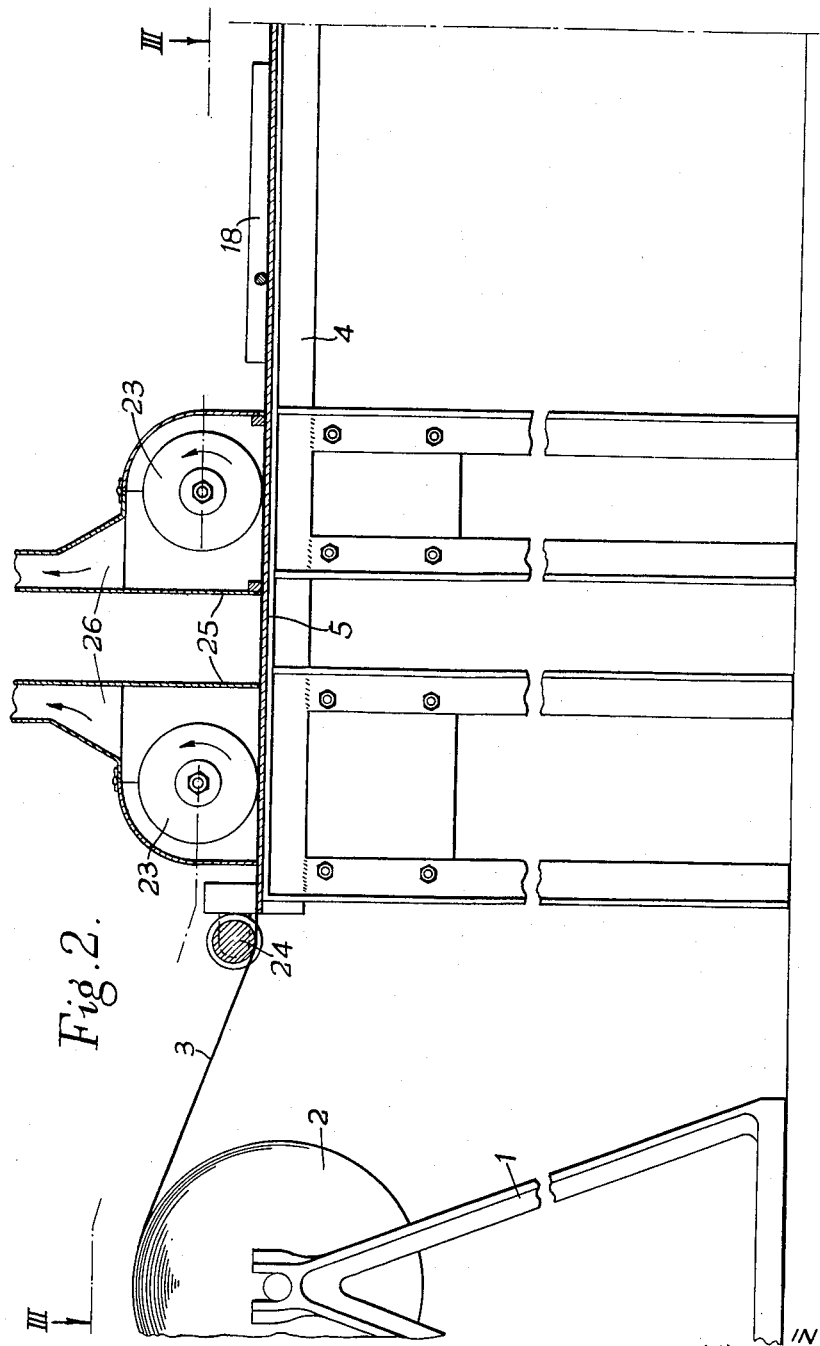
Fig. 2 is a part sectional side elevational view on a larger scale showing paper strip scoring means.
Figure 3:
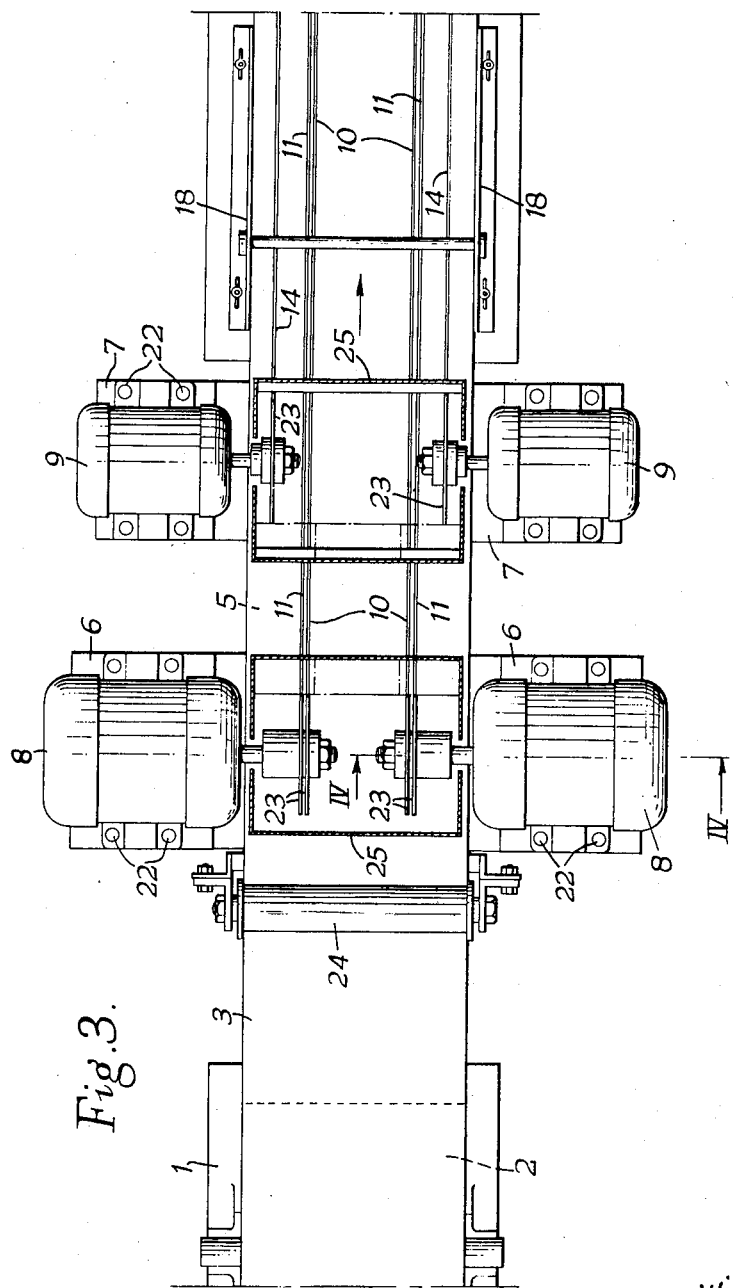
Fig. 3 is a view in part sectional plan taken on the line III—III of Fig. 2.

Referring to Figs. 1, 2 and 3 of the drawings, 1 is a stand for a reel 2 of lining paper 3 in strip form of uniform width.

The machine comprises a frame structure 4 surmounted at the starting end adjacent the stand 1, with a flat table top 5, over which the paper strip 3 is moved continuously in a manner yet to be described.

At each side of the table top 5 are mounted two brackets 6 and 7 each supporting an electric motor 8 or 9. The spindles of the electric motors 8 and 9 extend transversely over the flat table 5 from both sides and carry thin grinding discs 23 adapted to contact the paper strip 3 as it traverses the table 5, to produce longitudinal scored lines in the paper strip for the purpose of ensuring subsequent folding of the paper strip 3 to a required cross sectional form.

Figure 16:
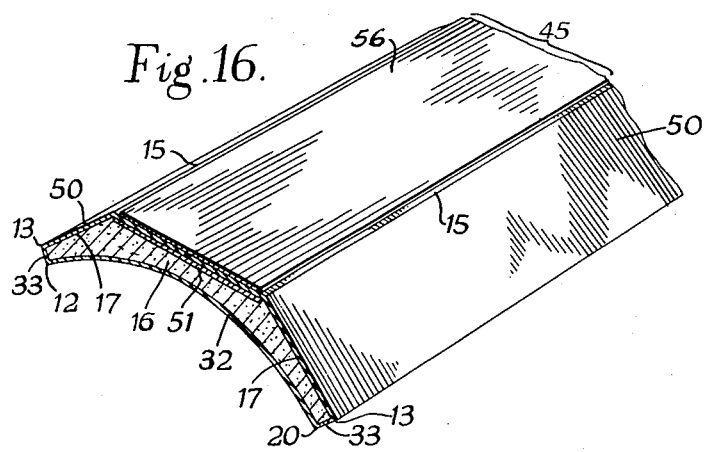
Fig. 16 is a perspective view of a section of the formed paper-encased "cove" strip.

In the case illustrated, designed to produce "cove" cornice of the cross-sectional form shown in Fig. 16, each of the two opposite motors 8 drives a pair of parallel and closely spaced discs 23 each pair being adapted to produce two parallel score lines 10 and 11 corresponding to the front and rear outer edges 12 and 13 of the finished cornice, and each of the other two opposite motors 9 drives one disc 23 adapted to produce a score line 14 parallel to the score lines 11 and 12, and corresponding to the line of junction 15 between the central longitudinal flat zone 16 and one of the two longitudinal zones 17 of the rear face of the finished cornice.

A flanged guide roller 24 is provided at the end of the table 5 nearest the reel 2 and a pair of adjustable side guides 18 are provided at the edges of the table 5 to ensure straight line movement of the paper strip 3 over the table, and the motors 8 and 9 are mounted for accurate adjustment of their positions on the brackets 6 and 7 (Fig. 4) in the direction transverse of the table 5, by means of adjusting screws 19, each screw 19 being rotatable in bearings on the respective bracket and engaging in a screwed lug 20 on a motor-supporting base 21, the bases 21 being bolted to the brackets by means of bolts 22, to retain the motors in the set positions.

The discs 23 are enclosed by dust collectors 75 connected with ducting 76 and the discs are driven in the same direction as that of the movement of the paper strip 3 beneath them.

On the table 5 at a location in advance of the scoring discs 23 is mounted a longitudinal shaping block 25 (Fig. 7) of arcuate form on its upper face and of a width corresponding to that of the ercuate front face 32 of the finished cornice, said block 25 being surrounded by a pressure block 26 of complementary form, and the paper strip is caused to move with its longitudinal centre zone between the blocks 25 and 26 so that an arcuate form is imparted to said central zone. At each side of the shaping and pressure blocks 25 and 26 are mounted fixed posts 65 located so that the side portions of the strip 3 extending outwards from the blocks 25 and 26 are deflected or folded upwards into or towards a vertical position as shown in Fig. 7.

Figure 6:
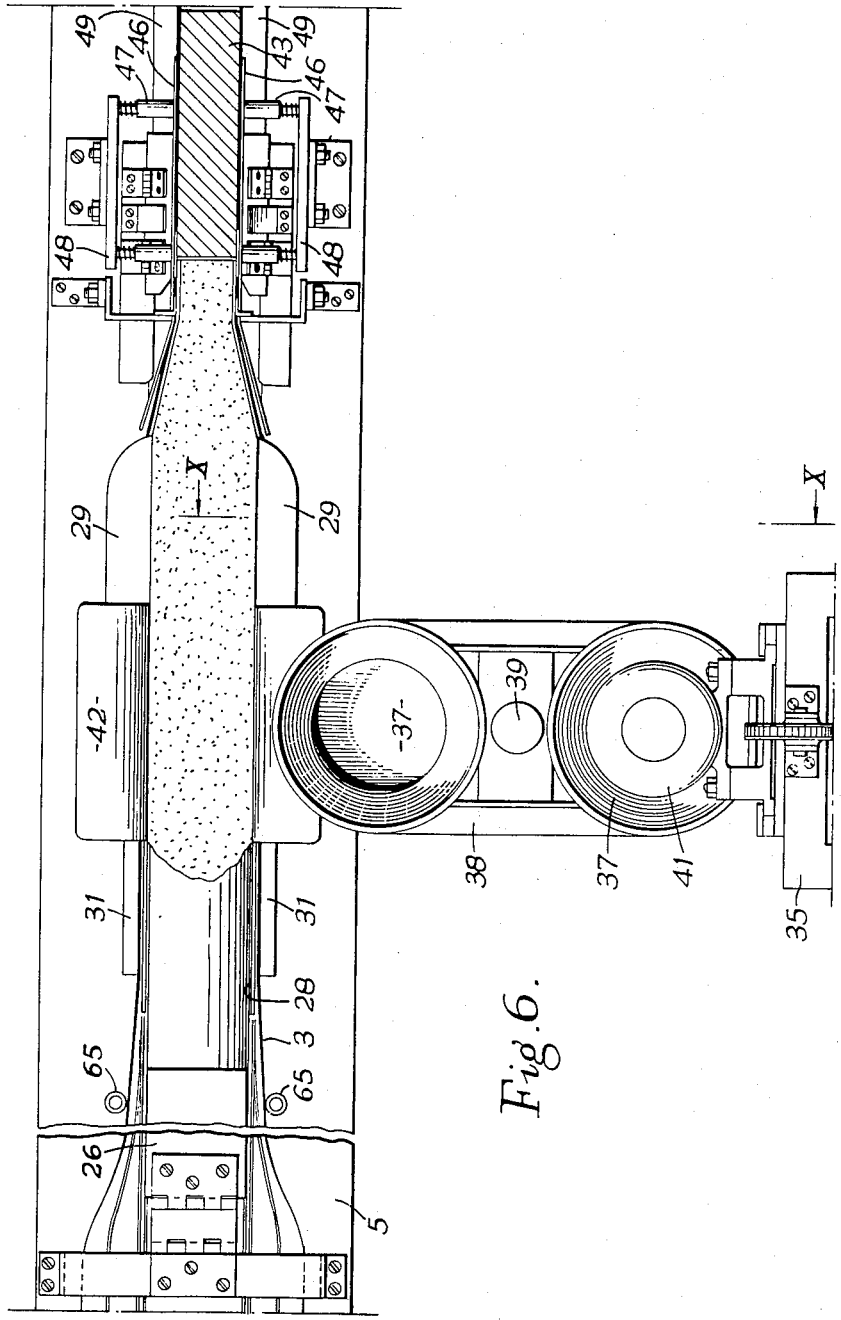
Fig. 6 is a part sectional plan view taken on the line VI—VI of Fig. 5.
Figure 8:
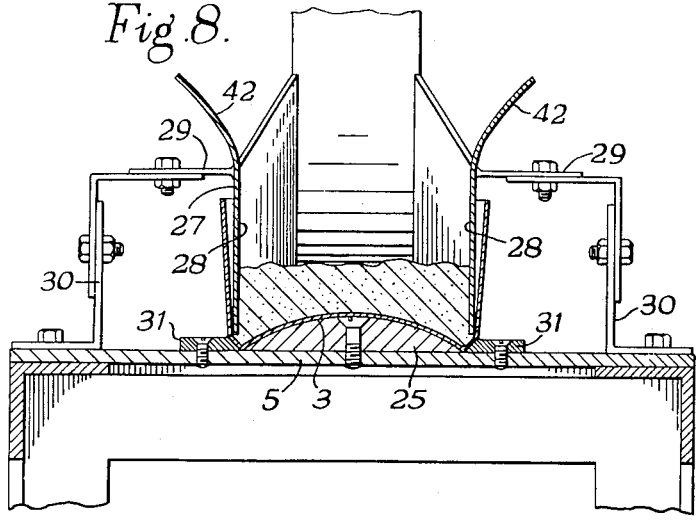

Beyond the pressure block 26 there is provided a sheet metal or like guide member 27 (Figs. 5, 6 and 8) having a pair of parallel vertical side walls 28 and open at the bottom, and provided with outwardly extending side flanges 29 secured to brackets 30 on the table 5. The lower edges of the side walls 28 of the guide member 27 are spaced a short distance above the table 5. On the table 5 at each side of the guide member 27 are fixed a pair of guide strips 31, the inner edges of which are chamfered as shown in Fig. 8 and spaced from the lower edges of the side wals 28 of the guide member 27 by a small distance sufficient to permit the passage of the paper strip 3 therebetween, with those parts of the strip 3 between the free edges threof and the outer score lines 14 extending generally vertically and against or close to the exterior of the walls 28 of the guide member 27 and with the central part of the strip 3 between those score lines 14 lying between the lower edges of the said walls 28, so that a trough is formed by the said central part of the strip 3 in conjunction with the walls 28 of the guide member 27 and the chamfered edges of the guide strips 31, of a shape corresponding to the arcuate front surface 32 and the two narrow angular flat edges 33 of the finished cornice strip.

The plaster slurry is applied on the paper strip by pouring into the above defined trough, the walls 28 of the guide member 27 serving as side retainers of the plaster slurry. For the application of the slurry there is mounted at one side of the machine, a pillar 35 (Fig. 10) supporting a bracket 36 carrying a pair of mixing buckets 37 tiltable upon the ends of a frame 38 rotatable about a pivot 39 on the bracket 36.

A stirrer 40 driven by a counter-weighted electric motor 41 is carried by the pillar 35. A measured charge of gypsum plaster is loaded into one of the buckets 37 over the bracket 36 and an appropriate quantity of water added from a suitable measuring source such as a tank 42 arranged to discharge a precise amount of water at each successive opening operation of the outlet valve thereof, and the motor 41 moved downwards to lower the stirrer 40 into the bucket to effect a rapid mix. The motor is then raised to raise the stirrer and the frame 30 rotated to bring the charged bucket 37 over the space between the walls 28 of the guide member 27, and the other bucket 37 into position for charging ready for the next mix.

Figure 10:
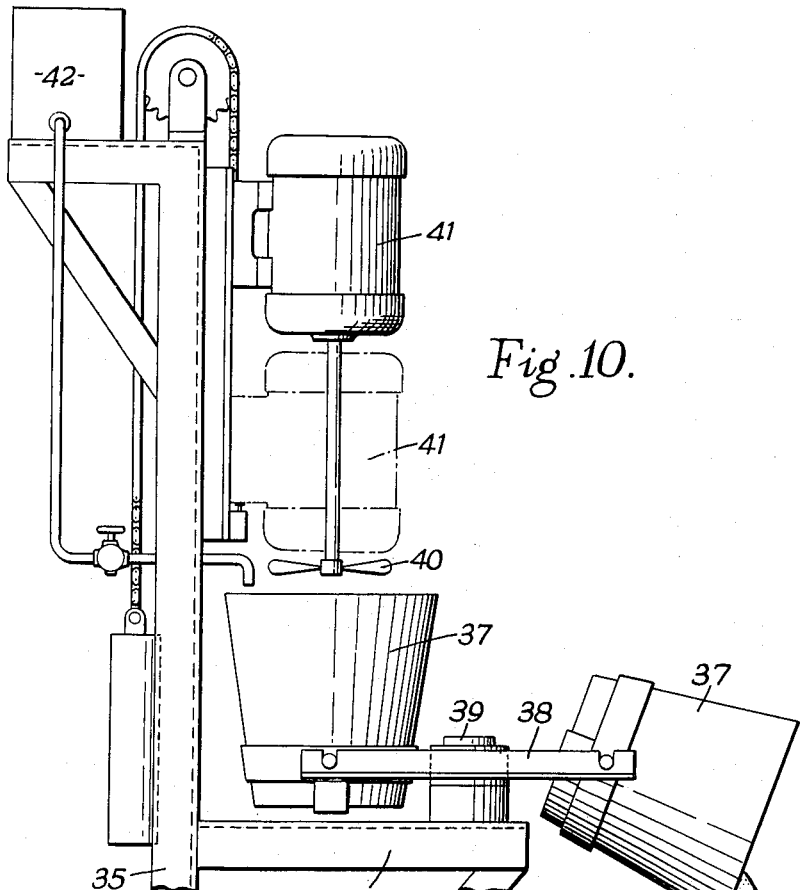
Fig. 10 is a view of a part of the apparatus for preparing and supplying plaster slurry.

Thus mixing in one bucket 37 can be carried out whilst pouring of slurry into the trough-like space between the walls 28 from the other bucket 37 proceeds, all as will be clear from Fig. 10 and a substantially continuous supply of slurry which remains of workable viscosity during subsequent forming operations can thereby be maintained, and furthermore cessation of operation of the machine may be effected readily at any time without risk of loss of any considerable quantity of plaster due to the inherent rapid setting characteristic of plaster.

Upwardly and outwardly extending ears 42 are provided at the upper edges of the walls 28 forming the sides of the trough to facilitate pouring of the plaster slurry into the trough.

At the outlet end of the pouring trough comprising the guide walls 28 there are mounted co-operating upper and lower rollers 43 and 44 (Fig. 5 and 9) rotatable about axes transverse of the table 5, the upper roller 43 being of an axial length corresponding with the width of the flat central zone 45 at the back of the finished cornice, and the lower roller 44 being of an axial length and peripherally profiled to the required width and shape of the arcuate front face 32 and the two narrow outer longitudinal edge zones 33 of the finished cornice.

The lower roller 44 extends upwards through an aperture in the table 5 into engagement with the underside of the paper strip 3.

On opposite sides of the lower part of the upper roller 43 are mounted pressure bars 46 carried by spring loaded plungers 47 mounted on brackets 48 fixed on the table 5, and below said pressure bars 46 are mounted a pair of inclined spring-loaded pressure plates 49 of a width corresponding to the width of the inclined rear faces 50 of the finished cornice and an inclination corresponding to that of said faces 50 with the flat central rear zone 45 of the finished cornice.

The lower roller 44 may be a driven roller and the upper roller 43 an idler roller.

Figure 9:
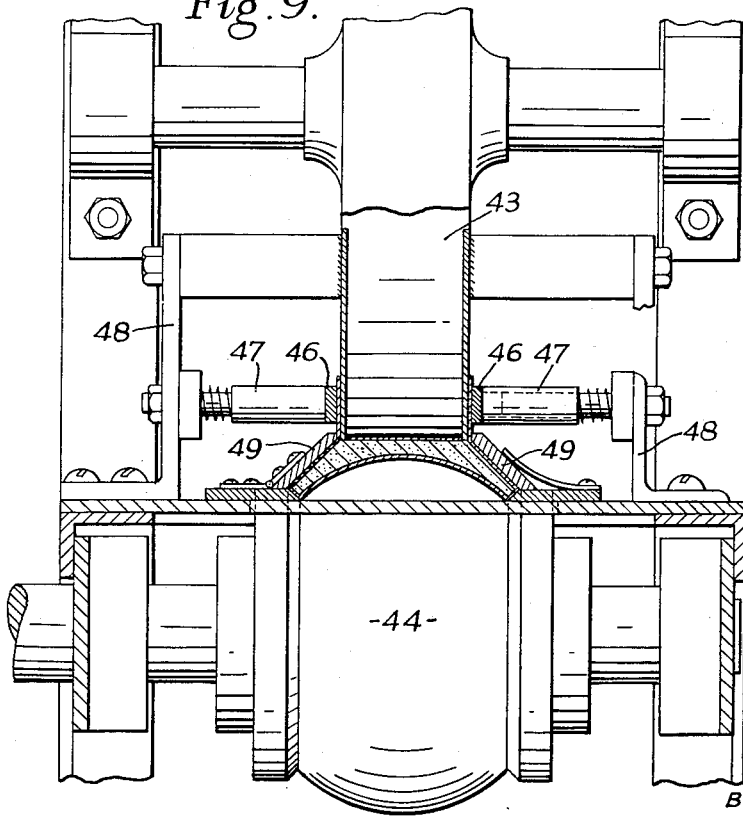

The arrangement is such that as the travelling paper strip 3, now of trough form and bearing the plaster slurry within its trough, passes out of the guide member 27, the side walls of the paper trough are caused to converge upon one another and to bend at the score lines 11 and 14 (Fig. 3) the parts of the paper strip between the score lines 11 and 14 engaging beneath the inclined pressure plates 49 and the parts of the paper strip between the score lines 14 and the free edges of the paper strip being being maintained vertical by engagement between the pressure plates 46 and the flat end surfaces of the upper roller 43 as shown in Fig. 9, and the plaster slurry is spread to fill the paper casing thus formed, by the pinch pressure of the rollers 43 and 44, the upper surface of the plaster core being rolled flat by the upper roller 43.

In the case illustrated, a further paper strip 51 is applied by the roller 43 to the upper surface of the plaster slurry, the paper strip 51 being drawn from a reel 52 (Fig. 5) and pressed on to the surface of the slurry by the roller 43. An adhesive is applied from a source 53 onto the surface of the roller 43 and transferred thereby to the surface of the separate paper strip which is uppermost when applied to the plaster.

From the rollers 43, 44, the strip 3 with the plaster core is passed over the end of the table 5 and on to an endless conveyor belt 54, the end of the table 5 and the conveyor 54 being provided with a central longitudinal hump 55 of arcuate section to engage the concave under surface of the composite plaster and paper strip to support the still unset plaster.

Figure 13:
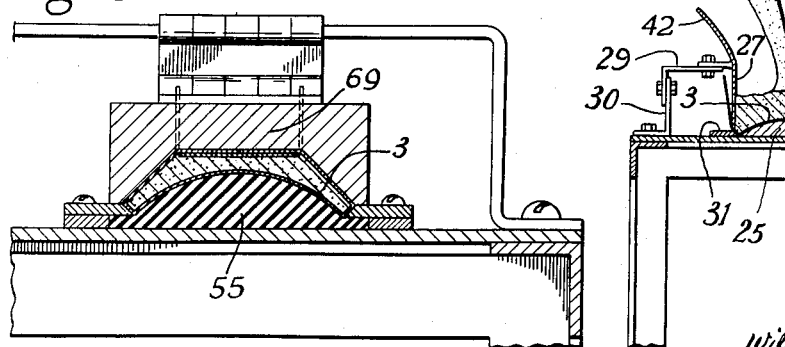
Figs. 13 and 14 are views in sectional end elevation illustrating the final step in the paper strip-folding operation.
Figure 14:
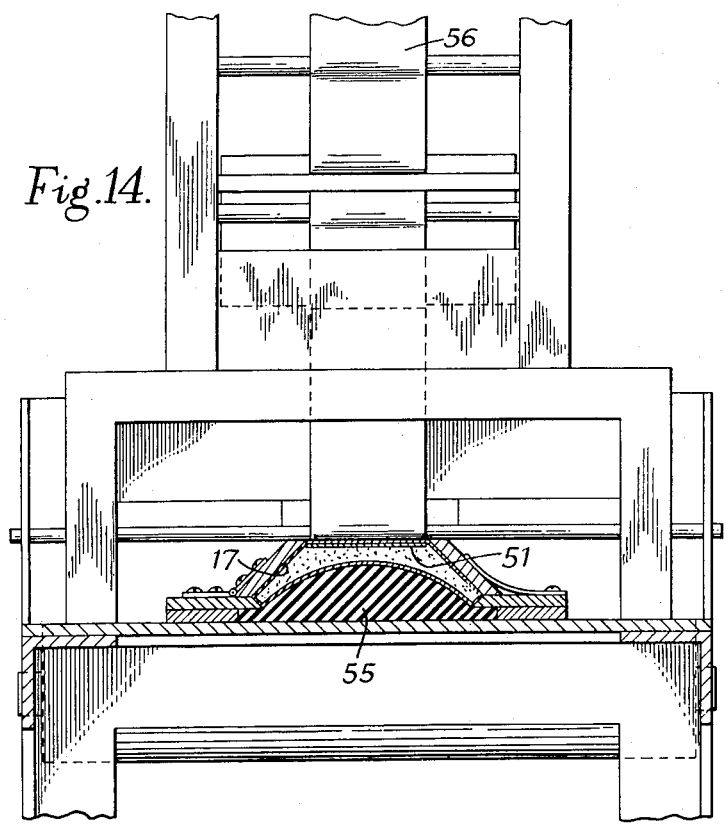

At a suitable point beyond the rollers 43 and 44 are provided convergent guides 68 (Figs. 11–13) for the engagement by the still vertical portions of the paper strip 3 outside the score lines 14, said guides terminating in a pressure block 69 (Fig. 13) whereby those vertical portions are folded inwardly and down about the fold lines 14 and pressed into engagement with the adhesive-coated surface of the already applied separate strip 51.

Thus is formed the required shaped plaster core totally enclosed in liner paper.

In the case illustrated means are provided to apply a further external paper strip 56 over the junction of the edges of the main paper strip 3 on the uppermost surface of the composite strip.

Such a further strip may be a strip 56 of adhesive paper from a roll 57 (Fig. 1).

The paper strip 56 is drawn over a damping roller 58 and thence beneath a guide roller 59 by the pull of the moving composite strip, and rolled down by engagement beneath an endless band 60 mounted with its lower run over and close to the formed strip.

The conveyor belt 54 is of a length to maintain the formed cornice in movement until the plaster core takes a preliminary set and the pull of the conveyor belt may constitute the driving means drawing the paper strip 3 from the supply reel and moving it and the plaster carried thereby and also the paper strips 51 and 56 from the reels 52 and 57 through the machine.

At a suitable point beyond the end of the conveyor belt 54 the formed and preliminarily set cornice strip moves on to a further support 61 including a number of profiled rollers 67 (Fig. 15) where it is cut into convenient lengths for subsequent handling and storing until fully set and hardened.

The cutter may be a guillotine, saw or the like 66 of any convenient kind (not shown) mounted upon a carrier 62 (Figs. 1 and 15) movable to and fro on the support 61 in the direction of movement of the formed cornice strip at the same speed as that of the cornice strip by means of a crank 63 driven in synchronism with the conveyor belt 54 (Fig. 1), the arrangement being such that the cutter 66 may be engaged with the cornice to cut it whilst the cutter carrier 62 is moving in the same direction and at the same speed as the formed cornice strip.

In Fig. 17 there is illustrated a modified form of the guide member 27 of Fig. 8 functioning as the plaster-retaining side walls 28 of the pouring trough.

In Fig. 17 the side walls 28 are provided on the exterior with secondary plates 64 spaced by a short distance from the walls 28 and such as to permit the vertical side portions of the trough-form paper strip 3 outside the score lines 11 to pass therethrough. Such secondary plates provide improved support for the side portions of the paper strip 3 and overcome any tendency to distortion of the paper, due for example to temporary excess of pressure of plaster slurry within the pouring trough.

It is to be understood that either or both of the separate strips 51 and 56 may be in some cases be omitted, since an effective bond is obtainable between the liner paper and gypsum plaster.

We claim:

1. An apparatus for the continuous production of paper-encased gypsum plaster strip having a front face, and a rear face including an intermediate zone and two outer zones at an angular inclination to one another and to said intermediate zone, said apparatus comprising a support for the paper strip, means for moving said paper strip longitudinally on said support, a first folding means for folding progressively the strip of paper into the form of an elongated trough as it moves along said support, guide means extending within the formed paper trough and constituting boundary side walls for the retention of plaster slurry introduced into the trough, a pair of superposed co-operating rollers located at a point beyond the guide means, the lower of said pair of rollers having a periphery shaped in cross section to correspond to the cross-sectional form of the front face of the paper-encased gypsum plaster strip to be formed and being disposed for engagement with the underside of the plaster-containing part of the travelling paper trough, and the upper of said pair of rollers being of a length corresponding to the width of the intermediate zone of said rear face of the strip and disposed so that its lower part lies within the plaster-containing part of the travelling paper trough but spaced from the bottom thereof, means for holding parts of the side walls of the travelling paper trough adjacent the edges thereof in engagement with the end surfaces of the upper roller, and a second folding means located beyond the pair of rollers adapted to fold down the said parts of the side walls of the paper trough on to the upper surface of the plaster in the paper trough.

2. An apparatus as claimed in claim 1 wherein the guide means is formed by a pair of spaced flat plates in general vertical disposition above the support with their lower edges spaced from the said support by a distance permitting passage of the paper strip beneath said lower edges of the flat plates, and fixed abutment members are mounted adjacent said lower edges of the flat plates for abutting and sliding engagement with the external surfaces of the bottom portion of the side walls of the paper trough.

3. An apparatus as claimed in claim 1 and including a pair of superposed shaping members having complementary arcuate surfaces to impart an arcuate form in cross section to the portion of said paper strip forming the front face of said gypsum plaster strip, said shaping members being disposed adjacent said first folding means.

4. An apparatus as claimed in claim 1 for the continuous production of paper-encased cove cornice strip of arcuate curved profile on its front face and having on its rear face a flat intermediate longitudinal zone bounded by two flat outer longitudinal zones in planes approximately at right angles to one another, and two narrow flat longitudinal angular edge surfaces joining said front face and said rear face, wherein said guide means includes a pair of spaced flat plates adapted for engagement by the inner surfaces of the side walls of the moving paper trough and a pair of further guide members disposed one at each side of the bottom of the paper trough, said further guide members having inclined edges adjacent the bottom of the paper trough and spaced from the lower edges of the pair of spaced flat plates by a distance to permit guided movements of the paper strip through the space and in contact with said inclined edges, and the lower of said pair of roller has a periphery shaped in cross section to correspond with the cross sectional form of the arcuate front face and the adjacent two narrow angular edges of the cornice strip to be formed, and the upper of said pair of rollers is of an axial length corresponding to the width of the flat intermediate longitudinal zone of the rear face of the cornice strip, and including a pair of inclined guide members disposed on opposite sides of the pinch between the pair of rollers and bridging the gap between the outer peripheral edges of the upper and lower co-operating rollers so as to fold parts of the paper strip constituting the walls of the paper trough to define the two inclined zones one on each side of the flat intermediate longitudinal zone of the rear face of the cornice strip, said second folding means being located beyond said pair of inclined guide members and serving to fold the free edges of the paper strip down onto the flat intermediate longitudinal zone of the rear face of the plaster core.

5. An apparatus as claimed in claim 1 and including means for feeding a second strip of paper beneath the upper of the pair of co-operating rollers and into contact with the central zone of the surface of the plaster slurry corresponding to the flat intermediate longitudinal zone of the rear face of the strip to be formed and means for supplying an adhesive to that surface of said second strip of paper which is uppermost when applied to the gypsum plaster.

6. An apparatus as claimed in claim 1 and including profiled supporting means in a position to receive and move the formed paper encased plaster strip, a cutter and a cutter carrier disposed at a point beyond the profiled supporting means, a crank adapted to impart to said cutter carrier reciprocating movement in the longitudinal direction of the paper-encased plaster strip and at the same speed as the paper-encased plaster strip in the direction of movement of the latter so that cutting of lengths of the paper-encased plaster strip may be effected with the cutter moving in the same direction and at the same speed as the paper-encased plaster strip.

7. An apparatus as claimed in claim 4 and including means for feeding a further strip of paper into adhering engagement with the parts of the main strip of paper forming the paper-lined flat intermediate longitudinal rear surface of the cornice strip.

References Cited in the file of this patent

UNITED STATES PATENTS

| | | |
|---|---|---|
| 1,029,328 | Utzman | June 11, 1912 |
| 1,348,387 | Armstrong | Aug. 3, 1920 |
| 1,383,255 | Birdsey | June 28, 1921 |
| 1,418,027 | Schumacher | May 30, 1922 |
| 1,507,332 | Buttress et al. | Sept. 2, 1924 |
| 1,718,890 | Birdsey | June 25, 1929 |